US009514100B2

(12) United States Patent
Li

(10) Patent No.: US 9,514,100 B2
(45) Date of Patent: Dec. 6, 2016

(54) METHOD, APPARATUS AND SYSTEM OF SCREENSHOT GRABBING AND SHARING

(71) Applicant: Intel Corporation, Santa Clara, CA (US)

(72) Inventor: Wenlong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 13/997,721

(22) PCT Filed: Oct. 8, 2012

(86) PCT No.: PCT/CN2012/001359
§ 371 (c)(1),
(2) Date: Jan. 7, 2014

(87) PCT Pub. No.: WO2014/056122
PCT Pub. Date: Apr. 17, 2014

(65) Prior Publication Data
US 2014/0115454 A1    Apr. 24, 2014

(51) Int. Cl.
*G06F 17/00*    (2006.01)
*G06F 17/21*    (2006.01)
*H04N 21/41*    (2011.01)
*H04N 21/414*    (2011.01)
*H04N 21/4223*    (2011.01)
*H04N 21/4363*    (2011.01)
*H04N 21/437*    (2011.01)
*H04N 21/4728*    (2011.01)
(Continued)

(52) U.S. Cl.
CPC ........ *G06F 17/212* (2013.01); *H04N 21/4122* (2013.01); *H04N 21/41407* (2013.01); *H04N 21/4223* (2013.01); *H04N 21/437* (2013.01); *H04N 21/43637* (2013.01); *H04N 21/4728* (2013.01); *H04N 21/4788* (2013.01); *H04N 21/8153* (2013.01)

(58) Field of Classification Search
CPC .................................................... G06F 17/212
See application file for complete search history.

(56) References Cited

U.S. PATENT DOCUMENTS 6,636,918 B1    10/2003  Aguilar et al.
6,781,635 B1     8/2004  Takeda
(Continued)

FOREIGN PATENT DOCUMENTS

CN    101650520 A    2/2010
CN    201422128 Y    3/2010
(Continued)

OTHER PUBLICATIONS

Machine translation of CN 102404641A, published Apr. 4, 2012, SHenzhen TCL New Technology Co., Ltd.*
(Continued)

*Primary Examiner* — Laurie Ries
(74) *Attorney, Agent, or Firm* — Barnes & Thornburg LLP

(57) ABSTRACT

A device, method and system of screenshot grabbing and sharing comprise projecting contents on a display device connected with a communication device; and grabbing a screenshot from the contents projected on the display device, in response to a screenshot grabbing request from another communication module connected with the communication device.

21 Claims, 4 Drawing Sheets

(51) Int. Cl.
*H04N 21/4788* (2011.01)
*H04N 21/81* (2011.01)

(56) References Cited

U.S. PATENT DOCUMENTS

| | | | | |
|---|---|---|---|---|
| 8,970,647 B2* | 3/2015 | Alsina | | G06F 9/4445 |
| | | | | 715/766 |
| 8,976,303 B2* | 3/2015 | Murugesan | | G06F 3/1454 |
| | | | | 348/564 |
| 2004/0190854 A1 | 9/2004 | Dunn | | H04N 5/4448 |
| | | | | 386/230 |
| 2005/0237397 A1* | 10/2005 | Pilu | | H04N 5/772 |
| | | | | 348/231.99 |
| 2006/0075348 A1* | 4/2006 | Xu | | G06F 3/0481 |
| | | | | 715/730 |
| 2006/0126812 A1* | 6/2006 | Carlson | | H04L 12/5855 |
| | | | | 379/156 |
| 2006/0136379 A1* | 6/2006 | Marino | | G06F 17/30247 |
| 2006/0150227 A1* | 7/2006 | Julia | | G08B 13/196 |
| | | | | 725/105 |
| 2006/0209214 A1* | 9/2006 | Fader | | G11B 27/031 |
| | | | | 348/584 |
| 2007/0001512 A1* | 1/2007 | Sato | | G08B 13/19647 |
| | | | | 307/9.1 |
| 2007/0220575 A1* | 9/2007 | Cooper | | H04N 7/1675 |
| | | | | 725/118 |
| 2008/0120369 A1* | 5/2008 | Gustavsson | | H04L 67/1095 |
| | | | | 709/204 |
| 2009/0245747 A1* | 10/2009 | Beyabani | | 386/46 |
| 2009/0305680 A1* | 12/2009 | Swift | | H04L 12/2602 |
| | | | | 455/414.1 |
| 2010/0070842 A1* | 3/2010 | Aymeloglu et al. | | 715/207 |
| 2010/0174993 A1* | 7/2010 | Pennington | | G06F 1/1616 |
| | | | | 715/738 |
| 2010/0317399 A1* | 12/2010 | Rodriguez | | H04M 1/0272 |
| | | | | 455/556.1 |
| 2011/0065459 A1 | 3/2011 | Cheng et al. | | |
| 2011/0119406 A1 | 5/2011 | Chang et al. | | |
| 2011/0130159 A1 | 6/2011 | Chen et al. | | |
| 2011/0173071 A1* | 7/2011 | Meyer | | G06Q 30/0256 |
| | | | | 705/14.54 |
| 2011/0173307 A1* | 7/2011 | Yu et al. | | 709/222 |
| 2011/0244919 A1* | 10/2011 | Aller | | G06K 9/00973 |
| | | | | 455/556.1 |
| 2012/0086857 A1* | 4/2012 | Kim et al. | | 348/563 |
| 2012/0162515 A1* | 6/2012 | Lee | | H04N 21/25816 |
| | | | | 348/563 |
| 2012/0164961 A1* | 6/2012 | Gao | | H04W 52/241 |
| | | | | 455/127.1 |
| 2012/0191770 A1* | 7/2012 | Perlmutter | | H04L 67/04 |
| | | | | 709/201 |
| 2012/0207449 A1 | 8/2012 | Angquist et al. | | |
| 2013/0041973 A1 | 2/2013 | Zhou | | |
| 2013/0125192 A1* | 5/2013 | Li | | H04N 21/4122 |
| | | | | 725/118 |
| 2013/0145407 A1* | 6/2013 | Han et al. | | 725/91 |
| 2014/0067825 A1* | 3/2014 | Oztaskent | | H04N 21/4782 |
| | | | | 707/748 |
| 2014/0089424 A1* | 3/2014 | Oztaskent | | H04L 51/08 |
| | | | | 709/206 |
| 2014/0104306 A1* | 4/2014 | Griffin | | G06F 17/30899 |
| | | | | 345/619 |
| 2014/0129942 A1* | 5/2014 | Rathod | | H04N 21/44222 |
| | | | | 715/720 |

FOREIGN PATENT DOCUMENTS

| | | |
|---|---|---|
| CN | 102075728 A | 5/2011 |
| CN | 102118499 A | 7/2011 |
| CN | 102143235 A | 8/2011 |
| CN | 201986047 U | 9/2011 |
| CN | 102404641 A | 4/2012 |
| JP | 2001352373 A | 12/2001 |
| WO | 2010093510 A1 | 8/2010 |
| WO | 2013037080 A1 | 3/2013 |
| WO | 2013037083 A1 | 3/2013 |
| WO | 2013037084 A1 | 3/2013 |
| WO | 2013143125 A1 | 10/2013 |

OTHER PUBLICATIONS

International Search Report and Written Opinion received for International Application No. PCT/CN2012/001359, mailed Jul. 11, 2013, 12 pages.

* cited by examiner

METHOD, APPARATUS AND SYSTEM OF SCREENSHOT GRABBING AND SHARING

FIELD OF THE INVENTION

An embodiment of the present invention relates to screenshots, more particularly, to screenshot grabbing and sharing among multiple devices.

BACKGROUND

With Intel® wireless display (WiDi) technology, contents can be shared among various devices. For example, a WiDi host may project the contents on a display device connected with the WiDi host via a WiDi device. Examples of the WiDi host may comprise a computer, a tablet, a smart phone or other communication device. Examples of the display device may comprise a television, or other big screen monitor supporting the WiDi technology. However, it is usually difficult for people to use their personal devices, such as smart phones, tablets and/or others, to obtain a screenshot of interest from the contents, when they watch the contents projected on the display device.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
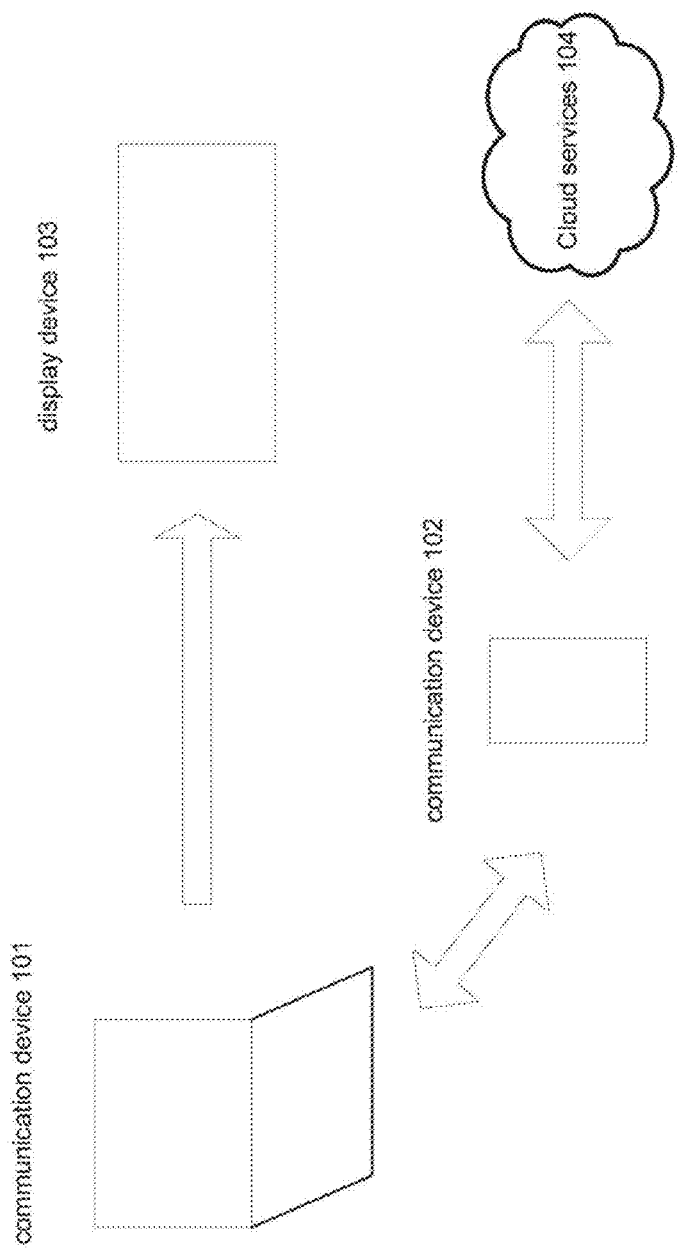
FIG. 1 illustrates an embodiment of a scenario of screenshot grabbing and sharing among various devices, including two communication devices and a display device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks, and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

FIG. 1 illustrates an embodiment of a scenario of screenshot grabbing and sharing among various devices, including communication devices 101 and 102 and a display device 103. In an embodiment, the communication device 101 may be connected with the display device 103 under various schemes, in order to project contents on the display device 103, for example, via a wired or wireless direct connection, or via a WiDi or the like indirect connection. The communication device 101 may be embodied as, without limitation, a laptop computer, a notebook computer, a desktop computer, a mobile computing system, a work station, a network appliance, a web appliance, a distributed computing system, a multiprocessor system, a processor-based system, a smart phone, a cellular telephone, a tablet, a consumer electronic device, and/or any other communication device configured to project contents on the display device 103. The display device 103 may be embodied as, without limitation, a television or a monitor supporting the above-stated direct or indirect connection with the communication device 101. The contents may be embodied as, without limitation, video, audio, images and/or others.

In an embodiment, the communication device 102 may be connected with the communication device 101 via a direct or indirect connection, such as a WiFi, WiFi Direct, Bluetooth, and/or others. The communication device 102 may or may not be connected with the display device 103.

A user of the communication device 102 may watch the contents projected on the display device 103 and request the communication device 101 to grab and share a screenshot of the contents, which the user is interested in. For example, upon seeing a particular style of a handbag on the display device 103, the user may want to know more about the handbag, e.g., brand and producer, and locate a store offering the handbag for sale. Using the communication device 102, the user may request the communication device 101 to capture and share the screenshot of the handbag. The communication device 102 may further handle the screenshot received from the communication device 101 either locally or externally, such as through cloud services 104. In an embodiment, the communication device 102 may crop an image area of the handbag and send the image to the cloud 104 for further processing.

The communication device 102 may be embodied as, without limitation, a smart phone, a cellular telephone, a tablet, a consumer electronic device, a laptop computer, a notebook computer, a desktop computer, a mobile computing system, a work station, a network appliance, a web appliance, a distributed computing system, a multiprocessor system, a processor-based system, and/or any other communication device configured to request the communication device 101 for the screenshot grabbing and sharing.

Figure 2:
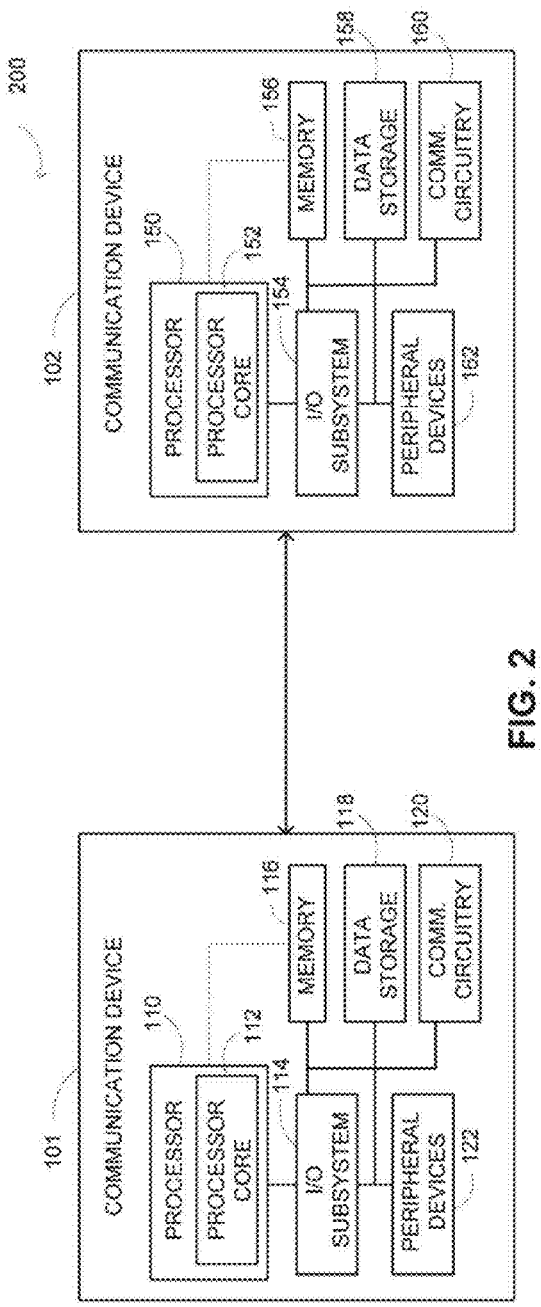
FIG. 2 illustrates an embodiment of a system of the two communication devices.

FIG. 2 illustrates an embodiment of a system 200 of the two communication devices 101 and 102. The communication device 101 may include a processor 110, an I/O subsystem 114, a memory 116, a data storage 118, a communication circuitry 120, and one or more peripheral devices 122. In some embodiments, several of the foregoing components may be incorporated on a motherboard or main board of the communication device 101, while other components may be communicatively coupled to the motherboard via, for example, a peripheral port. Furthermore, it should be appreciated that the communication device 101 may include other components, sub-components, and devices commonly found in a communication and/or computing device, which are not illustrated in FIG. 2 for clarity of the description.

The processor 110 of the communication device 101 may be embodied as any type of processor capable of executing software/firmware, such as a microprocessor, digital signal processor, microcontroller, or the like. The processor 110 is illustratively embodied as a single core processor having a processor core 112. However, in other embodiments, the processor 110 may be embodied as a multi-core processor having multiple processor cores 112. Additionally, the communication device 101 may include additional processors 110 having one or more processor cores 112.

The I/O subsystem 114 of the communication device 101 may be embodied as circuitry and/or components to facilitate input/output operations with the processor 110 and/or other components of the communication device 102. In some embodiments, the I/O subsystem 114 may be embodied as a memory controller hub (MCH or "northbridge"), an input/output controller hub (ICH or "southbridge") or platform controller hub (PCH), and a firmware device. In such embodiments, the firmware device of the I/O subsystem 114 may be embodied as a memory device for storing Basic Input/Output System (BIOS) data and/or instructions and/or other information (e.g., a BIOS driver used during booting of the communication device 101). However, in other embodiments, I/O subsystems having other configurations may be used. For example, in some embodiments, the I/O subsystem 114 may be embodied as a platform controller hub (PCH). In such embodiments, the memory controller hub (MCH) may be incorporated in or otherwise associated with the processor 110, and the processor 110 may communicate directly with the memory 116 (as shown by the dashed line in FIG. 2). Additionally, in other embodiments, the I/O subsystem 114 may form a portion of a system-on-a-chip (SoC) and be incorporated, along with the processor 110 and other components of the communication device 101, on a single integrated circuit chip.

The processor 110 is communicatively coupled to the I/O subsystem 114 via a number of signal paths. These signal paths (and other signal paths illustrated in FIG. 1) may be embodied as any type of signal paths capable of facilitating communication between the components of the communication device 101. For example, the signal paths may be embodied as any number of point-to-point links, wires, cables, light guides, printed circuit board traces, vias, bus, intervening devices, and/or the like.

The memory 116 of the communication device 101 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 116 is communicatively coupled to the I/O subsystem 114 via a number of signal paths. Although only a single memory device 116 is illustrated in FIG. 2, the communication device 101 may include additional memory devices in other embodiments. Various data and software may be stored in the memory 116. For example, one or more operating systems, applications, programs, libraries, and drivers that make up the software stack executed by the processor 110 may reside in memory 116 during execution.

The data storage 118 may be embodied as any type of device or devices configured for the short-term or long-term storage of data. For example, the data storage 118 may include any one or more memory devices and circuits, memory cards, hard disk drives, solid-state drives, or other data storage devices The communication circuitry 120 of the communication device 101 may include any number of devices and circuitry for enabling communications between the communication device 101 and one or more devices or networks as discussed in more detail below. The communication circuitry 120 may be configured to use any one or more, or combination thereof, communication protocols to communicate, such as, for example, a cellular communication protocol (e.g., Wideband Code Division Multiple Access (W-CDMA)), a wireless network communication protocol (e.g., Wi-Fi®, WiMAX), a wireless personal area network communication protocol (e.g., Bluetooth®), a wired network communication protocol (e.g., TCP/IP), and/or other communication protocols.

In some embodiments, the communication device 101 may also include one or more peripheral devices 122. Such peripheral devices 122 may include any number of additional input/output devices, interface devices, and/or other peripheral devices. For example, in some embodiments, the peripheral devices 122 may include a display, touch screen, graphics circuitry, keyboard, speaker system, and/or other input/output devices, interface devices, and/or peripheral devices.

The communication device 102 may be substantially similar to the communication device 101 and include similar components, which have been identified in FIG. 2 with a common reference numbering scheme, e.g., a processor 150, a processor core 152, a I/O subsystem 154, a memory 156, a data storage 158, a communication circuitry 160 and one or more peripheral devices 162. As such, the description provided above of the components of the communication device 101 is equally applicable to those similar components of the communication device 102 and is not repeated herein so as not to obscure the present disclosure. Of course, it should be appreciated that in some embodiments the communication devices 101, 102 of the system 200 may be dissimilar to each other. For example, the communication devices 101 and 102 may be embodied as various types of communication devices different from each other (e.g., a laptop computer, a notebook computer, a tablet, a smart phone, or other communication device) and include components typically found in such corresponding communication devices.

Figure 3:
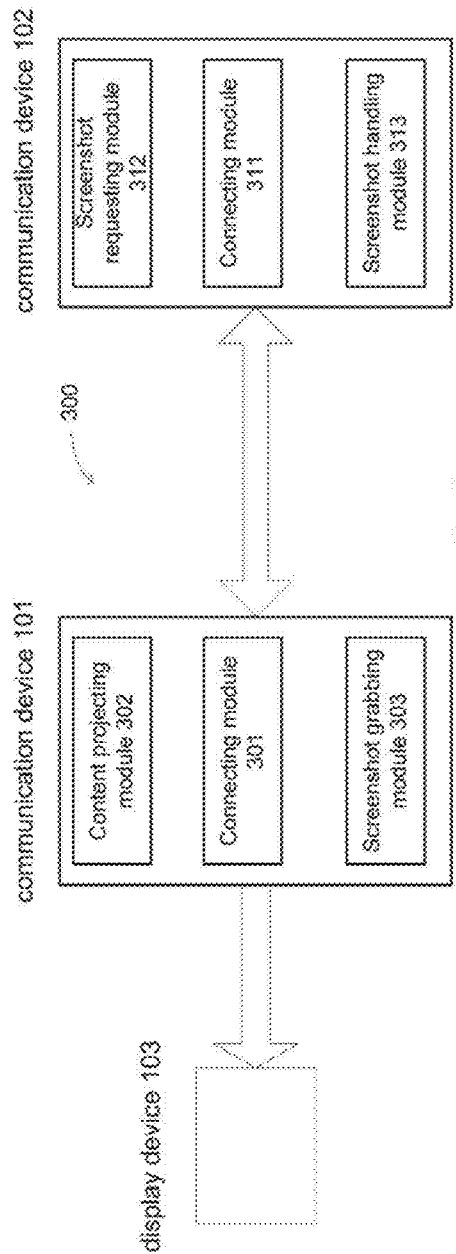
FIG. 3 illustrates an embodiment of an environment for screenshot grabbing and sharing, which is established by the two communication devices.

FIG. 3 illustrates an embodiment of an environment 300 for the screenshot grabbing and sharing, which is established by the two communication devices. The illustrative environment 300 may include a connecting module 301, a content projecting module 302, and a screenshot grabbing module 303, which may be established by the communication device 101. The illustrative environment 300 may further include a connecting module 311, a screenshot requesting module 312 and a screenshot handling module 313, which may be established by the communication device 102. The various modules of the environment 300 may be embodied as hardware, software, firmware or a combination thereof. For example, any of the above-stated modules may be embodied as software instructions stored in a machine-readable medium of the communication device 101 or 102, such as the memory 116 or the memory 156.

In an embodiment, the connecting module 301 may connect the communication device 101 with the display device 103, either through a wired/wireless direct connection, or through the WiDi or the like indirect connection. The connecting module 301 may further connect the communication device 101 with the communication device 102 through a wired/wireless connection, such as WiFi, WiFi direct, Bluetooth, and/or others. The connecting module 301 may further register the communication device 102 on the communication device 101, including authenticating the communication device 102 and/or managing an authenticated device list to restrict requests of the screenshot grabbing and sharing from an unauthenticated device.

The content projecting module 302 may project the contents from the communication device 101 to the display device 103 via the connection built by the connecting module 301, such as the WiDi connection. The screenshot grabbing module 303 may grab the screenshot from the contents that the communication device 101 projected onto the display device 103, e.g., in response to the request of screenshot grabbing and sharing from the communication device 102. In an embodiment, the user of the communication device 102 may watch the contents on the display device 103, and through the communication device 102, request the communication device 101 to provide the screenshot that the user is interested in.

In an embodiment, the request from the communication device 102 may include information related to the screenshot, which may help the screenshot grabbing module 303 to grab the screenshot, such as program guide programming (PGP) information of the content, a timestamp of the request and/or others. In this way, the screenshot grabbing module 303 may grab the screenshot with the timestamp from the content related to the PGP information. Examples of the PGP information may include a program title, actor/actress, and/or others. The screenshot grabbing module 303 may further use the connecting module 301 to send the grabbed screenshot to the communication device 102.

In an embodiment, the connecting module 311 may connect the communication device 102 with the communication device 101 through a wired/wireless connection, such as WiFi, WiFi Direct, Blue Tooth, and/or others. In an embodiment, the connecting module 311 may utilize a network address of the communication device 101 displayed on the display device 103 or the screen of the communication device 101 to connect with the communication device 101.

The screenshot requesting module 312 may generate the request of grabbing the screenshot from the contents projected on the display device 103, which the communication device 101 may or may not be connected with. In an embodiment, the screenshot requesting module 312 may generate the request in response to an instruction from the user of the communication device 102, e.g., through pressing a special key on the keyboard, a software "grabbing" button on the screen, or a touch-screen gesture. The screenshot requesting module 312 may include the information related to the screenshot, which may help the communication device 101 to grab the requested screenshot, such as the PGP information of the content, the timestamp of the request and/or others. In this way, the screenshot grabbing module 303 may grab the screenshot with the timestamp from the content related to the PGP information. Examples of the PGP information may include the program title, actor/actress, and/or others.

The screenshot handling module 313 may handle the screenshot received from the communication device 101 either locally or externally, such as through the cloud services 104. For example, the screenshot handling module 313 may crop the image area of interest from the screenshot and send the image area to the cloud 104 for further processing, such as image recognition, information searching and/or others. The cloud 104 may return a result of the processing to the communication device 102. Many technologies may be adopted for cropping the image area, for example, cropping the image area circled with a finger on a touch screen of the communication device 102, as illustrated in FIG. 5. More details about FIG. 5 may be provided in a later description.

Figure 4:
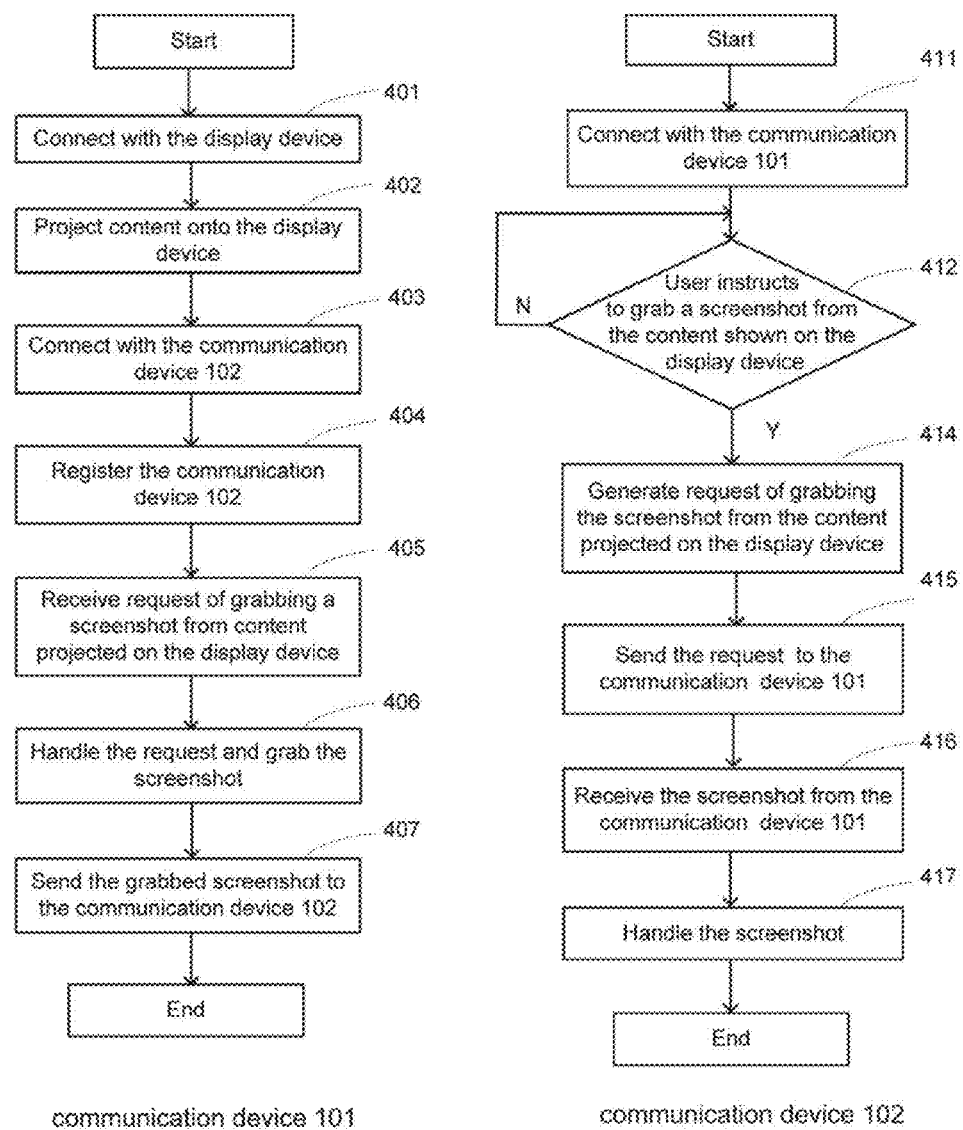
FIG. 4 illustrates an embodiment of a method of screenshot grabbing and sharing between the two communication devices.

FIG. 4 illustrates a method of screenshot grabbing and sharing between the two communication devices. The method on the left is implemented by the communication device 101 and the method on the right is implemented by the communication device 102.

Referring to the method on the left, in block 401, the connecting module 301 or other device may connect the communication device 101 with the display device 103 either through a wired/wireless direct connection or through the WiDi or the like indirect connection. In block 402, the content projecting module 302 or other device may project the contents from the communication device 101 to the display device 103 via the connection established in block 401. In block 403, the connecting module 301 or the other device may connect the communication device 101 with the communication device 102 through a wired/wireless connection, such as WiFi, WiFi Direct, Bluetooth, and/or others. In block 404, the connecting module 301 or other device may register the communication device 102 on the communication device 101, including authenticating the communication device 102 and/or managing an authenticated device list to restrict requests of the screenshot grabbing and sharing from an unauthenticated device.

In block 405, the connecting module 301 or other device may receive the request of grabbing the screenshot from the contents projected on the display device 103. In an embodiment, the request may include the information helpful for the communication device 101 to grab the screenshot, such as the PGP information of the content, the timestamp of the request and/or others. Examples of the PGP information may include the program title, actor/actress, and/or others. In response to the request, in block 406, the screenshot grabbing module 303 or other device may grab the screenshot from the contents, for example, the screenshot with the timestamp from the content related to the PGP information. In block 407, the connecting module 301 or other device may send the grabbed screenshot to the communication device 102.

Referring to the method on the right, in block 411, the connecting module 311 or other device may connect the communication device 102 with the communication device 101 through the wired/wireless connection, such as WiFi, WiFi direct, Bluetooth, and/or others. In an embodiment, the connecting module 311 may utilize the network address of the communication device 101 displayed on the display device 103 or the screen of the communication device 101 to connect with the communication device 101. In block 412, the screenshot requesting module 312 or other device may detect whether the user instructs to grab the screenshot form the contents projected on the display device. In an embodiment, the user may watch the contents on the display device and instruct to grab the screenshot of interest through pressing the key on the keyboard or the "grabbing" button on the screen or the touchscreen gesture.

Upon detecting the user instruction, in block 413, the screenshot requesting module 312 or other device may generate the request of grabbing the screenshot. In an embodiment, the request may include the information related to the screenshot, which may help the communication device 101 to grab the screenshot, such as the PGP information of the content, the timestamp of the request and/or others. For example, the communication device 101 may grab the screenshot with the timestamp from the content related to the PGP information. Examples of the PGP information may include the program title, actor/actress, and/or others. In block 414, the connecting module 311 or other device may send the request to the communication device 101 through the connection established in block 411. In block 415, the connecting module 311 or other device may receive the requested screenshot from the communication device 101, and in block 416, the screenshot handling module 313 or other device may handle the screenshot either locally or externally, such as through the cloud services 104. For example, the screenshot handling module 313 may crop the image areas of interest from the screenshot and send the image areas to the cloud 104 for image recognition and/or any other processing.

Figure 5A:
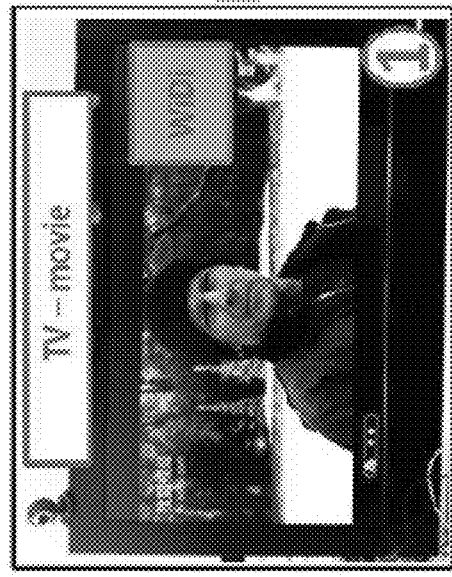
FIG. 5A to FIG. 5E illustrate an embodiment of grabbing and sharing the screenshot among the various devices.
Figure 5B:
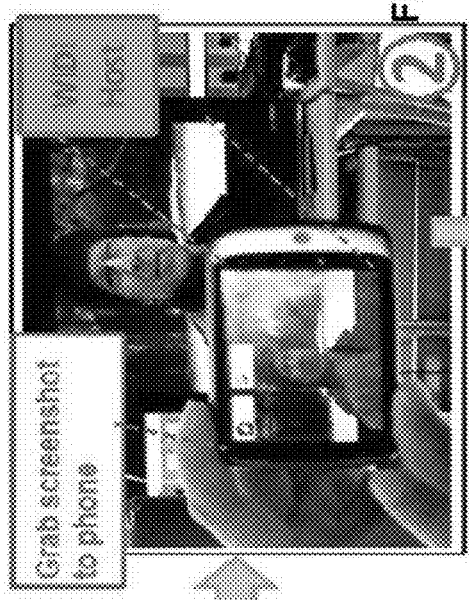
Figure 5C:
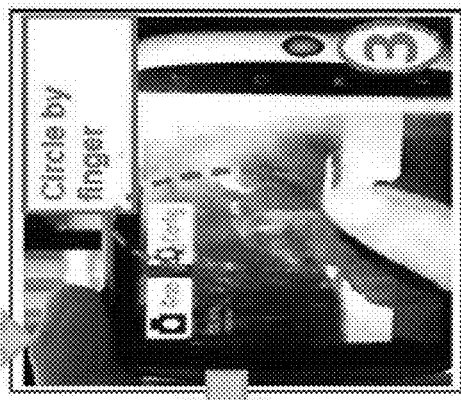
Figure 5D:
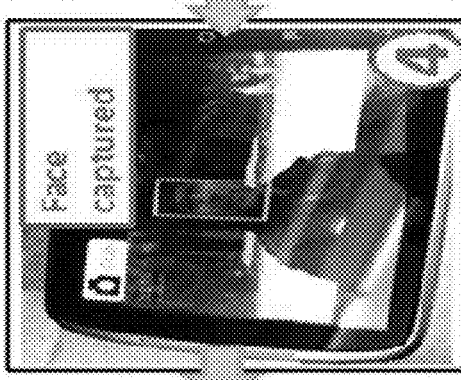
Figure 5E:

FIG. 5A to FIG. 5E illustrate an embodiment of grabbing and sharing the screenshot among the various devices, such as the communication device 101 (e.g., WiDi host in FIG. 5), the communication device 102 (e.g., smart phone in FIG. 5) and the display device 103 (e.g., television in FIG. 5). FIG. 5*a* illustrates that the television may display a movie projected from the WiDi host, where the user of the smart phone sees a movie screenshot is interesting. For example, the user may want to know more about an actor appearing on the screenshot. FIG. 5*b* illustrates that the smart phone may obtain the movie screenshot from the WiDi host. FIG. 5*c* illustrates that the user may circle an image area of the screenshot, e.g., the actor's face, with a finger movement on a touch screen of the smart phone. FIG. 5*d* illustrates that the smart phone may capture the image area by sensing the finger movement and FIG. 5*e* illustrates that the smart phone may obtain more information about the actor through further processing the cropped image area. For example, the smart phone may send the cropped image area to the cloud service 104 which may recognize the actor's face and search for the actor's information.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

EXAMPLES

Illustrative examples of the devices, systems, and methods disclosed herein are provided below. An embodiment of the devices, systems, and methods may include any one or more, and any combination of, the examples described below.

In one example, a communication device may comprise a content projecting module to project contents on a display device connected with the communication device; and a screenshot grabbing module to grab a screenshot from the contents projected on the display device, in response to a screenshot grabbing request from another communication module connected with the communication device. Additionally, in an example, the display device is a television. Additionally, in any of the above examples, the communication device further comprises a connecting module to connect the communication device with the display device via a WiDi device.

Additionally, in any of the above examples, the connecting module may further connect the communication device with the another communication device via WiFi. Additionally, in any of the above examples, the connecting module may further register the another mobile communication device on the communication device. Additionally, in any of the above examples, the connecting module may further send the grabbed screenshot to the another communication device.

In one example, a method operated by a communication device may comprise projecting contents on a display device connected with the communication device; and grabbing a screenshot from the contents projected on the display device, in response to a screenshot grabbing request from another communication module connected with the communication device. Additionally, in an example, the display device is a television. Additionally, in any of the above examples, the method may comprise connecting the communication device with the display device via a WiDi device. Additionally, in any of the above examples, the method may further comprise connecting the communication device with the another communication device via WiFi.

Additionally, in any of the above examples, the method may further comprise registering the another communication device on the communication device. Additionally, in any of the above examples, the method may further comprise sending the grabbed screenshot to the another communication device.

In one example, a communication device may comprise a screenshot requesting module to generate a request of grabbing a screenshot from a content projected from another communication device to a display device, in response to an instruction from a user of the communication device; and a connecting module to connect the communication device with the another communication device and send the request to the another communication device. Additionally, in an example, the display device is a television.

Additionally, in any of the above examples, the communication device is disconnected with the display device. Additionally, in any of the above examples, the communication device may further comprise a screenshot handling module to handle the screenshot received from the another communication device via the connecting module. Additionally, in any of the above examples, the screenshot grabbing request further comprises program guide programming information of the content, and a timestamp of the request.

In one example, a method operated by a communication device may comprise generating a request of grabbing a screenshot from contents projected from another communication device to a display device, in response to an instruction from a user of the communication device; and sending the request to another communication device connected with the communication device. Additionally, in an example, the display device is a television. Additionally, in any of the above examples, the communication device may be disconnected with the display device.

Additionally, in any of the above examples, the method may further comprise receiving the screenshot from the another communication device; and handling the screenshot. Additionally, in any of the above examples, the screenshot grabbing request further comprises program guide programming information of the content, and a timestamp of the request.

What is claimed is:

1. A communication device, comprising:
one or more processors to implement:
a content projecting module to wirelessly transmit contents to a display device for display thereby, wherein the communication device is physically separate from the display device;
a screenshot grabbing module to obtain, within the contents displayed by the display device, a screenshot as a function of a timestamp and program guide information specified in a screenshot grabbing request from another communication device that is in wireless communication with the communication device; and
a connecting module to receive the screenshot grabbing request from the another communication device and to transmit the screenshot to the another communication device in response to the request.

2. The communication device of claim 1, wherein the display device is a television.

3. The communication device of claim 1, wherein the connecting module is further to connect the communication device with the display device via a WiDi device.

4. The communication device of claim 3, wherein the connecting module is further to connect the communication device with the another communication device via WiFi.

5. The communication device of claim 3, wherein the connecting module is further to register the another mobile communication device on the communication device.

6. One or more non-transitory machine readable storage media comprising a plurality of instructions that in response to being executed cause a communication device to:
transmit contents to a display device for display thereby, wherein the communication device is physically separate from the display device;
receive a screenshot grabbing request from another communication device that is in wireless communication with the communication device;
obtain, within the contents displayed by the display device, a screenshot as a function of a timestamp and program guide information specified in the screenshot grabbing request; and
transmit the screenshot to the another communication device in response to the request.

7. The non-transitory machine readable media of claim 6, wherein the display device is a television.

8. The non-transitory machine readable media of claim 6, further comprising a plurality of instructions that in response to being executed cause the communication device to:
connect the communication device with the display device via a WiDi device.

9. The non-transitory machine readable media of claim 6, further comprising a plurality of instructions that in response to being executed cause the communication device to connect the communication device with the another communication device via WiFi.

10. The non-transitory machine readable media of claim 6, further comprising a plurality of instructions that in response to being executed cause the communication device to register the another mobile communication device on the communication device.

11. A communication device, comprising:
one or more processors to implement:
a screenshot requesting module to generate a request to grab a screenshot from contents wirelessly transmitted from another communication device to a display device that is physically separate from the another communication device, in response to an instruction from a user of the communication device, wherein the request includes a timestamp and program guide information usable by the another communication device to identify the screenshot within the contents; and
a connecting module to connect the communication device with the another communication device, to send the request to the another communication device, and to receive the screenshot from the another communication device.

12. The communication device of claim 11, wherein the display device is a television.

13. The communication device of claim 11, wherein the communication device is disconnected with the display device.

14. The communication device of claim 11, further comprising a screenshot handling module to handle the screenshot received from the another communication device via the connecting module.

15. The communication device of claim 14, wherein the screenshot handling module is further to crop an image area from the screenshot, send the image area to a cloud service and receive information about the image area from the cloud service.

16. The communication device of claim 14, wherein the screenshot handling module is further to crop an image area from the screenshot through sensing a finger movement on a touchscreen of the communication device, in which the finger movement is to circle the image area.

17. One or more non-transitory machine readable storage media comprising a plurality of instructions that in response to being executed cause a communication device to:
generate a request to grab a screenshot from contents wirelessly transmitted from another communication device to a display device that is physically separate from the another communication device, in response to an instruction from a user of the communication device, wherein the request includes a timestamp and program guide information usable by the another communication device to identify the screenshot within the contents;
send the request to the another communication device connected with the communication device; and
receive the screenshot from the another communication device.

18. The non-transitory machine readable media of claim 17, wherein the display device is a television.

19. The non-transitory machine readable media of claim 17, wherein the communication device is disconnected with the display device.

20. The non-transitory machine readable media of claim 17, further comprising a plurality of instructions that in response to being executed cause the communication device to:
crop an image area from the screenshot;
send the image area to a cloud service; and
receive information about the image area from the cloud service.

21. The non-transitory machine readable media of claim 20, wherein to crop the image area further comprises to sense a finger movement on a touchscreen of the communication device, in which the finger movement is to circle the image area.

* * * * *